United States Patent
Jeong

(10) Patent No.: US 9,416,936 B2
(45) Date of Patent: Aug. 16, 2016

(54) PRISM SHEET, AND BACK LIGHT UNIT AND LIQUID CRYSTAL DISPLAY DEVICE THEREWITH

(71) Applicant: LG Display Co., Ltd., Seoul (KR)

(72) Inventor: Young-Hun Jeong, Gyeongsangbuk-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/334,467

(22) Filed: Jul. 17, 2014

(65) Prior Publication Data

US 2014/0327858 A1    Nov. 6, 2014

Related U.S. Application Data

(62) Division of application No. 12/477,406, filed on Jun. 3, 2009, now Pat. No. 8,823,901.

(30) Foreign Application Priority Data

Jun. 4, 2008   (KR) .......................... 10-2008-0052480

(51) Int. Cl.
| | | |
|---|---|---|
| *F21V 5/02* | (2006.01) | |
| *G02B 1/04* | (2006.01) | |
| *G02F 1/1335* | (2006.01) | |
| *G02B 5/04* | (2006.01) | |

(52) U.S. Cl.
CPC . *F21V 5/02* (2013.01); *G02B 5/045* (2013.01); *G02F 1/1336* (2013.01); *G02F 1/133504* (2013.01); *G02F 1/133606* (2013.01); *G02F 2001/133607* (2013.01)

(58) Field of Classification Search
CPC ................... G02F 1/133606; G02F 1/133504; G02F 2001/133607; G02B 6/0053; G02B 6/0036; G02B 6/005; G02B 5/045; F21V 5/02
See application file for complete search history.

(56) References Cited

U.S. PATENT DOCUMENTS

| | | | |
|---|---|---|---|
| 3,213,753 A * | 10/1965 | Rogers ..................... 359/489.16 |
| 6,276,803 B1 | 8/2001 | Aoyama et al. |
| 6,755,545 B2 | 6/2004 | Lee |
| 2006/0109681 A1 | 5/2006 | Kim et al. |
| 2007/0024968 A1 | 2/2007 | Kim et al. |
| 2008/0130112 A1 | 6/2008 | Hsu et al. |
| 2008/0130119 A1 | 6/2008 | Hsu et al. |

FOREIGN PATENT DOCUMENTS

| | | |
|---|---|---|
| KR | 1020080019802 A | 3/2008 |
| KR | 1020080039956 A | 5/2008 |

OTHER PUBLICATIONS

Korean Office Action issued in Korean Patent Application No. 10-2008-0052480 on Nov. 19, 2012.

* cited by examiner

*Primary Examiner* — Jessica M Merlin
(74) *Attorney, Agent, or Firm* — Morgan, Lewis & Bockius LLP

(57) ABSTRACT

The present invention relates a prism sheet, and a back light unit and a liquid crystal display device therewith, in which total thickness of a back light unit is reduced while taking place of the lamp mura is prevented, for improving a picture quality.

The prism sheet includes a plurality of first prism mountains formed on a supporting film at regular intervals, a resin layer filled between the first prism mountains, and a plurality of second prism mountains formed on the resin layer and the first prism mountains with at intervals greater than the intervals of the first prism mountains.

15 Claims, 7 Drawing Sheets

PRISM SHEET, AND BACK LIGHT UNIT AND LIQUID CRYSTAL DISPLAY DEVICE THEREWITH

CROSS REFERENCE TO RELATED APPLICATION

This application is a Divisional Application of U.S. patent application Ser. No. 12/477,406, filed on Jun. 3, 2009, which claims the benefit of the Patent Korean Application No. 10-2008-0052480, filed on Jun. 4, 2008, which is hereby incorporated by reference as if fully set forth herein.

BACKGROUND OF THE DISCLOSURE

1. Field of the Disclosure

The present invention relates to liquid crystal display devices, and more particularly, to a prism sheet which is made to improve lamp mura, and a back light unit and a liquid crystal display device therewith.

2. Discussion of the Related Art

As an information oriented society is developed, demands for display devices have been increased in a variety of forms. To meet the demands, various flat display devices including liquid crystal display devices LCD, plasma display devices PDP, electro-luminescence display devices ELD, have been studied and some of which are used widely as display device, already.

Of the flat display devices, currently, the liquid crystal display device replaces the cathode ray tube CRT rapidly owing to advantages of a good picture quality, light weight, thin, low power consumption, and so on. The liquid crystal display device is developing as a monitor of a notebook computer, display panel of a TV set, and so on.

The liquid crystal display device has a back light unit mounted to a back side of a liquid crystal display panel, for displaying a desired image by cutting/passing a light from the back light unit by controlling a switch for each of pixels on the liquid crystal panel.

In the back light unit, there are an edge lighting type back light unit which has a light source at an edge of the liquid crystal display panel, and a direct lighting type back light unit which has a plurality of light sources arranged at regular intervals.

Presently, the direct lighting type back light unit is developing to be slim by reducing an overall thickness of the back light unit while providing a minimum gap between the lamps and sheets.

Since such back light unit has many advantages in view of system, producers of the liquid crystal display device put many efforts for developing a slim back light unit.

FIG. 1 illustrates a related art back light unit, schematically.

Referring to FIG. 1, the related art liquid crystal display device is provided with a cover bottom 10, a reflective plate 20 formed on an inside surface of the cover bottom 10, a plurality of lamps 30 arranged on the reflective plate 20 at regular intervals for emitting a light, a diffusion plate 40 over the lamps 30 for diffusing the light, a plurality of optical sheets 50 on the diffusion plate 40 for scattering the light diffused thus, a mold frame 60 which surrounds the cover bottom 10 and edges of the optical sheets 50, a liquid crystal display panel 70 over the diffusion plate 40 seated on an edge of the mold frame for displaying the image, and a case top 80 for fastening the mold frame 60 and the liquid crystal display panel 70.

The optical sheets 50 has two diffusion sheets, a protective sheet, and two prism sheets, and may have a polarized light separation sheet depending on products.

In the meantime, currently, in fabrication of the liquid crystal display device having the directing lighting type back light unit applied thereto, producers put much efforts in fabricating a larger, slimmer, and lower cost liquid crystal display device, by removing the sheets.

With regard to the distances between the reflective plate 20 and the lamps 30, and between the lamps 30 and the diffusion plate 40, lamp mura is shown if the distances are made shorter or a number of the lamps are reduced for reducing an overall thickness, and the lamp mura is shown even in a case the optical sheets are removed, selectively.

FIG. 2 illustrates a diagram of the prism sheet in a related art back light unit.

Referring to FIG. 2, the related art prism sheet 60 is provided with a diffusion film 62, and a plurality of prism mountains 63 on the diffusion film 62.

Each of the prism mountains 63 has a shape of a triangular column arranged such that an apex thereof faces the diffusion sheet 61. The prism mountains 63 scatters the light from the lamps toward the diffusion sheet 61.

In the meantime, the prism sheet 60 converges a light diverging in an X-axis direction better or diverging in a Y-axis direction better depending on a direction of arrangement of the prism mountains 63.

In detail, the prism sheet 60 scatters the light diverging in a direction sloped surfaces of the prism mountains 63 face, i.e., in the Y-axis direction in the drawing, efficiently. Opposite to this, the prism sheet 60 scatters the light diverging in a length direction of the prism mountains 63, i.e., in the Y-axis direction in the drawing, poorly.

According to this, the light passed through the prism sheet 60 spreads in the Y-axis direction less (due to good converging), and in the X-axis direction more (due to poor converging).

Thereafter, the light passed through the prism sheet 60 thus is incident on a back side of the liquid crystal display panel via the diffusion sheet 61. In this instance, due to a difference of converging efficiency depending on the directions, a picture quality can be poor due to the light incident on a back side of the liquid crystal display panel.

FIG. 3 illustrates a diagram for explaining problems taking place in the related art back light unit.

Referring to FIG. 3, with regard to the distances between the reflective plate 20 and the lamps 30, and between the lamps 30 and the diffusion plate 40 shown in FIG. 1, lamp mura is shown if the distances are made shorter or a number of the lamps are reduced for reducing an overall thickness, and the lamp mura is also shown even in a case the optical sheets are removed, selectively.

The lamp mura is shown in a case emission angles of the lights from the lamps overlap with each other, making an overlapped portion brighter than surroundings. That is, in order to make the emission angles not to overlap, a certain distance is required between the lamps and the diffusion plate, and if the distance is shorter, problems with respect to an outer appearance, such as the lamp mura, takes place.

SUMMARY OF THE DISCLOSURE

Accordingly, the present invention is directed to a prism sheet, and a back light unit and a liquid crystal display device therewith.

An object of the present invention is to provide a prism sheet, and a back light unit and a liquid crystal display device therewith, in which total thickness of a back light unit is reduced while taking place of the lamp mura is prevented, for improving a picture quality.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a prism sheet includes a plurality of first prism mountains formed on a supporting film at regular intervals, a resin layer filled between the first prism mountains, and a plurality of second prism mountains formed on the resin layer and the first prism mountains with at intervals greater than the intervals of the first prism mountains.

In another aspect of the present invention, a back light unit includes a plurality of light sources arranged at regular intervals for emission of a light, a cover bottom for supporting and housing the light sources, a diffusion plate over the light sources having opposite edges supported on the cover bottom for diffusing and forward the light from the light sources, and a prism sheet as claimed in one of claims 1 to 4 formed on the diffusion plate for scattering and spreading the light from the diffusion plate, uniformly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
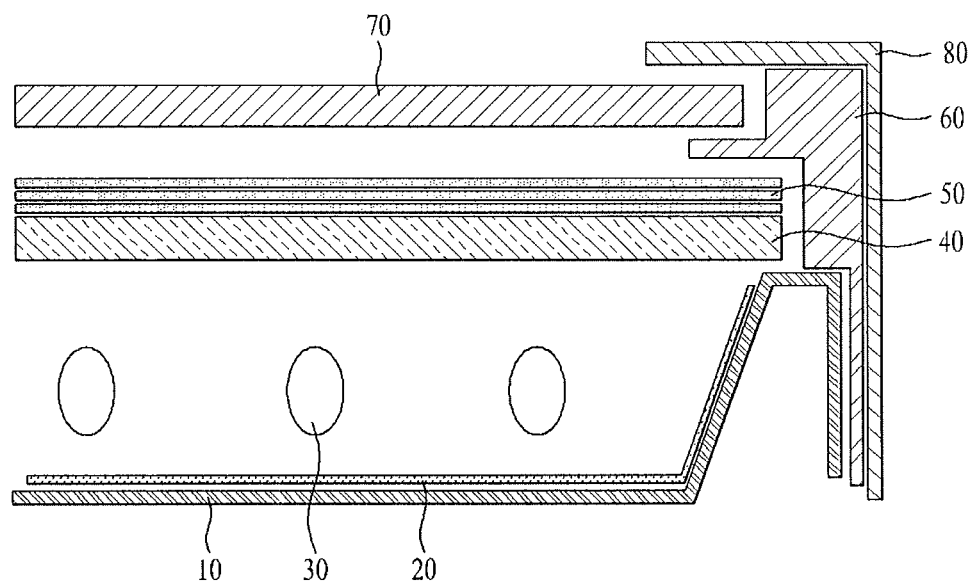
FIG. 1 illustrates a diagram of a related art back light unit, schematically.
Figure 2:
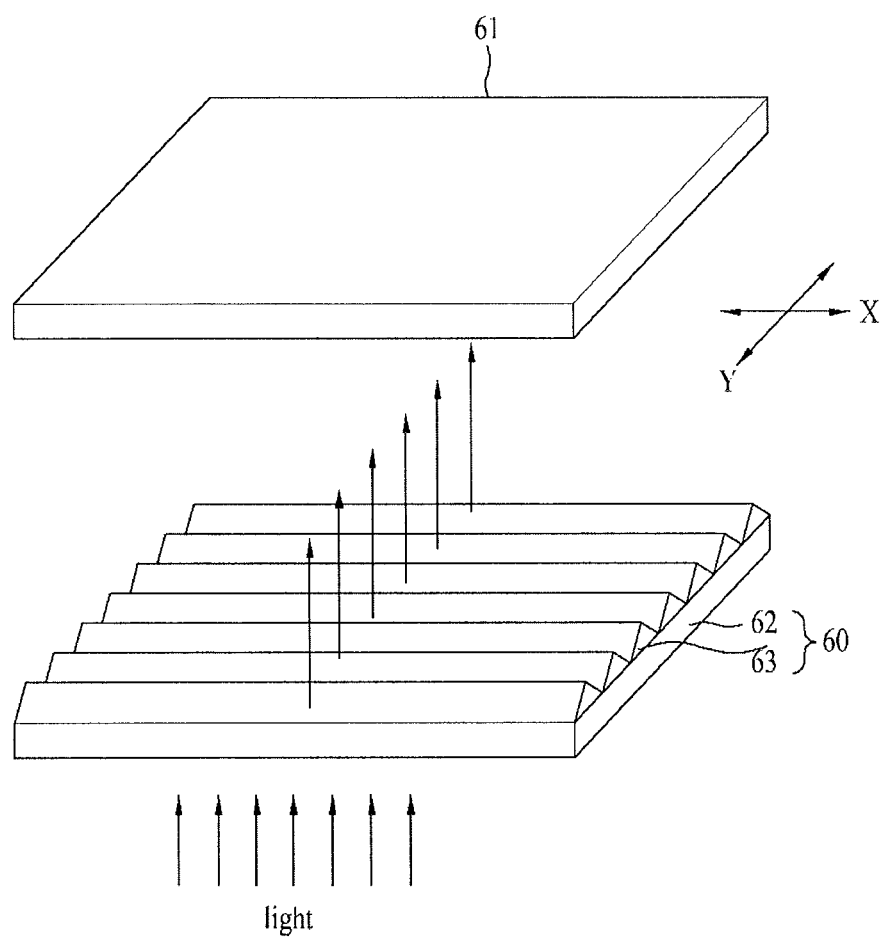
FIG. 2 illustrates a diagram of the prism sheet in a related art back light unit.
Figure 3:
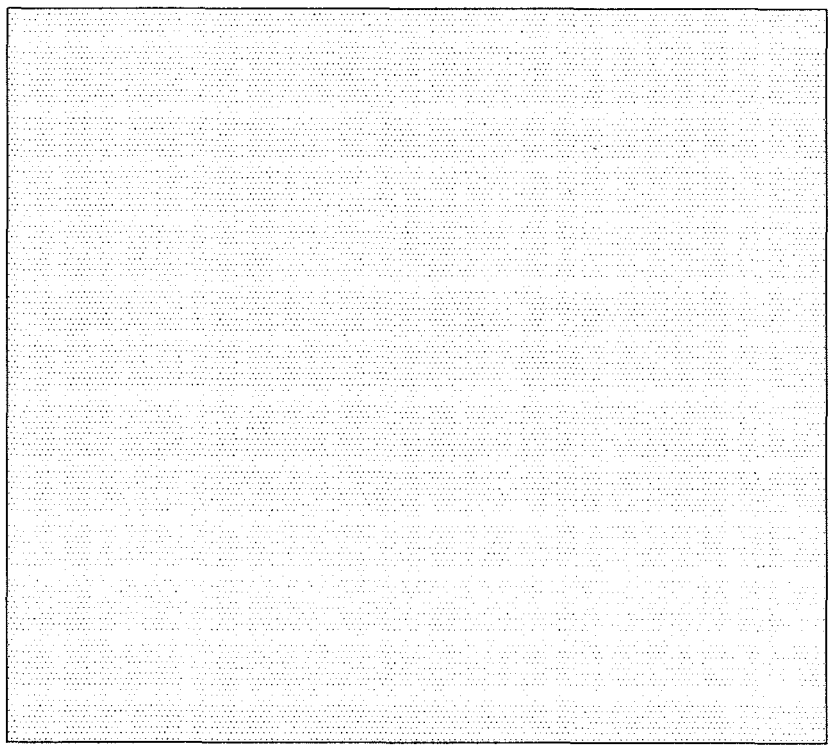
FIG. 3 illustrates a diagram for explaining problems taking place in the related art back light unit.
Figure 4:
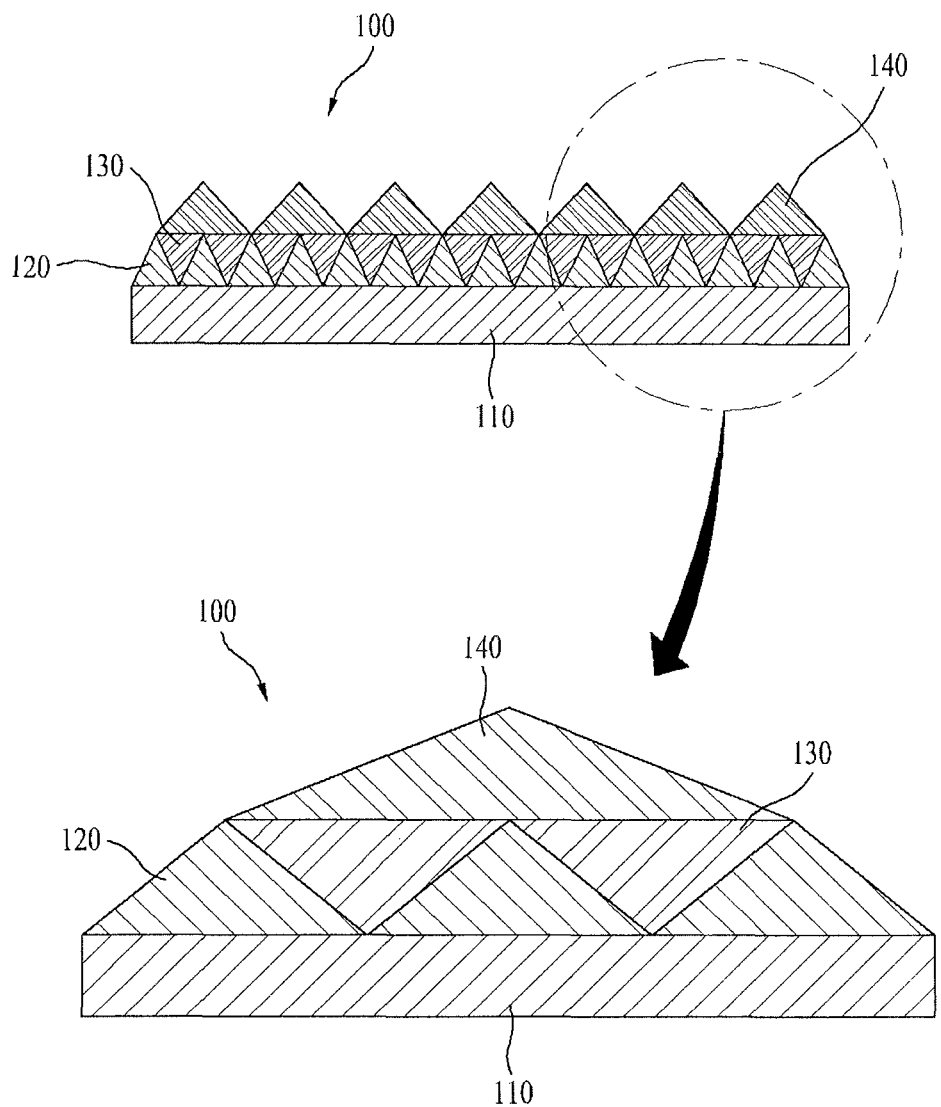
FIG. 4 illustrates a section of a prism sheet in accordance with a first preferred embodiment of the present invention.
Figure 5:
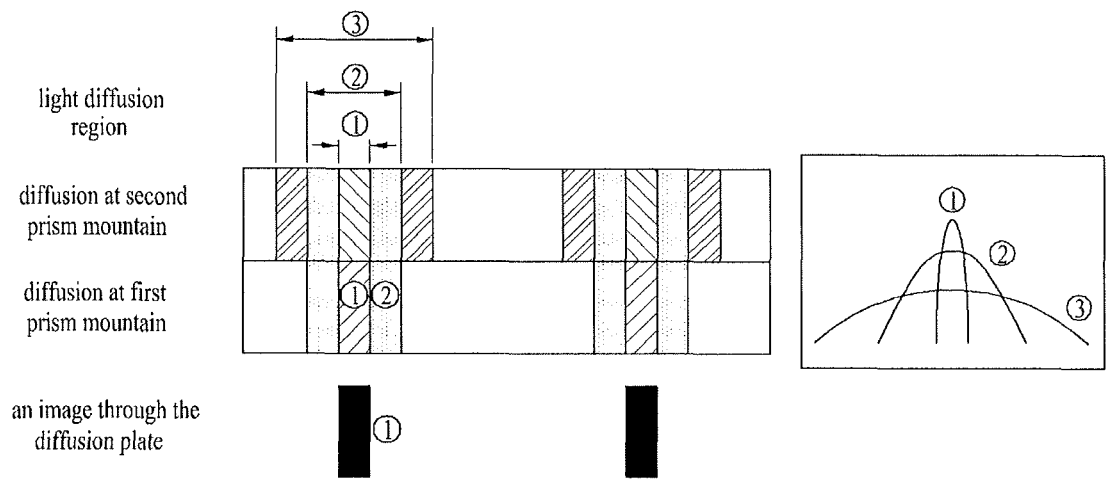
FIG. 5 illustrates a diagram for explaining a light diffusion profile of the prism sheet of the present invention.

FIG. 4 illustrates a section of a prism sheet in accordance with a first preferred embodiment of the present invention, and FIG. 5 illustrates a diagram for explaining a light diffusion profile of the prism sheet of the present invention.

Referring to FIG. 4, the prism sheet 100 for changing a path of a light from a lamp, and increasing brightness of the light includes first prism mountains 120 formed on a PET film 110 at regular intervals, resin layers 130 formed between the first mountains 130, and second prism mountains 140 each formed on the resin layer 130 such that a center of a bottom side thereof is placed on one of the first prism mountains 120 and ends of the bottom side are placed on adjacent first mountains 120.

The first prism mountains 120 are a plurality of triangular patterns formed at regular intervals, and the resin layer 130 is filled between adjacent first prism mountains 120 to form an inverted triangle, and the second prism mountain 140 is placed on the resin layer 130 filled thus, having, in general, a pitch of a pitch of the first prism mountain×2.

The pitch of the second prism mountain 140 has a size of 50 µm≤pitch≤100 µm, and the pitch of the first prism mountain 120 or the resin layer 130 has a size of ½ of the pitch of the second prism mountain 140. That is, each of the first prism mountain 120 and the resin layer 130 has a pitch of 20~50 µm.

The resin layer 130 filled between adjacent mountains 120 is filled from a bottom to an upper side by 50~100%, and the upper side may be formed to be concave or convex.

Each of the first prism mountain 120 and the resin layer 130 have an apex of a regular angle, and the second prism mountain 140 has an obtuse angle greater than the regular angle. Though it is described that the second prism mountain 140 has an obtuse angle greater than the regular angle, the angle of the second prism mountain 140, is not limited to this, but may have a regular angle or a certain curvature (3~5 µm.

Since the prism sheet can separate and scatter the light, the first and second prism mountains 120 and 140 are formed for scattering a lamp image widely to attenuate the lamp mura.

That is, referring to FIG. 5, since the lamp image is sharp as shown in a profile ①, a problem of outer appearance takes place. If the lamp image passes through the first prism mountain 120, the lamp image is spread as shown in a profile ② to attenuate the sharp lamp image, and if the lamp image passes through the second prism mountain 140, the lamp image is spread widely as shown in a profile ③, such that the lamp mura is invisible.

Figure 6:
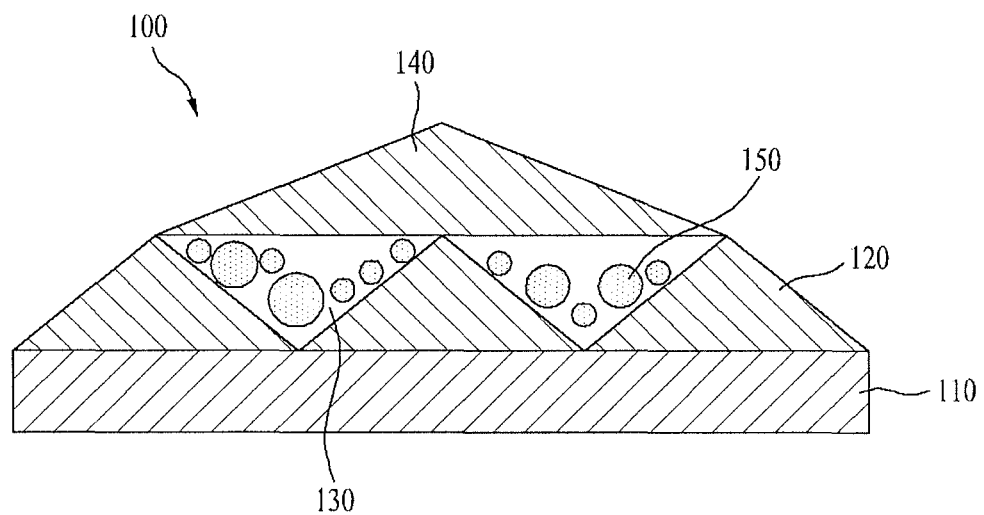
FIG. 6 illustrates a section of a prism sheet in accordance with a second preferred embodiment of the present invention.

FIG. 6 illustrates a section of a prism sheet in accordance with a second preferred embodiment of the present invention.

Referring to FIG. 6, a prism sheet 100 for changing a path of a light from a lamp and increasing brightness of the light includes first prism mountains 120 formed on a PET film 110 at regular intervals, a resin layer 130 formed between the first prism mountains 120 adjacent to each other, diffusion agent 150 formed in the resin layer 130, and a second prism mountain 140 formed on the resin layer such that a center of a bottom side thereof is placed on one of the first prism mountains 120 and ends of the bottom side respectively are placed on adjacent first prism mountains 120.

The first prism mountains 120 are a plurality of triangular patterns formed at regular intervals, and the resin layer 130 is filled between adjacent first prism mountains 120 to form an inverted triangle with diffusing agent filled therein, and the second prism mountain 140 is placed on the resin layer 130 having the diffusing agent filled thus, having, in general, a pitch of a pitch of the first prism mountain×2. That is, the second prism mountain 140 has a pitch greater than the first prism mountain 120.

The pitch of the second prism mountain 140 has a size of 5 μm≤pitch≤100 μm, and the pitch of each of the first prism mountain 120 and the resin layer 130 has a size of ½ of the pitch of the second prism mountain 140. That is, each of the first prism mountain 120 and the resin layer 130 has a pitch of 20~50 μm.

The resin layer 130 filled between adjacent mountains 120 is filled from a bottom to an upper side by 50~100%, and the upper side may be formed to be concave or convex.

Each of the first prism mountain 120 and the resin layer 130 have an apex of a regular angle, and the second prism mountain 140 has an obtuse angle greater than the regular angle. Though it is described that the second prism mountain 140 has an obtuse angle greater than the regular angle, the angle of the second prism mountain 140, is not limited to this, but may have a regular angle or a certain curvature (3~5 μm.

Since the prism sheet 100 can separate and scatter the light, the first and second prism mountains 120 and 140 are formed, the resin layer 130 is formed between adjacent first prism mountains 120 and the diffusion agent 150 such as beads is filled in the resin layer 130 for scattering a lamp image widely to attenuate the lamp mura.

Figure 7:
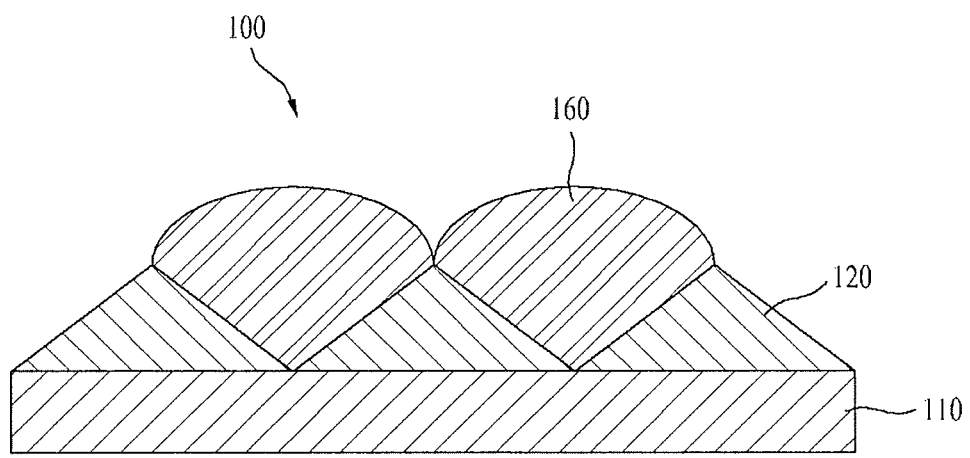
FIG. 7 illustrates a section of a prism sheet in accordance with a third preferred embodiment of the present invention.

FIG. 7 illustrates a section of a prism sheet in accordance with a third preferred embodiment of the present invention.

Referring to FIG. 7, the prism sheet 100 for changing a path of a light from a lamp and increasing brightness of the light includes prism mountains 120 formed on a PET film 110 at regular intervals, and lenti type blocks 160 filled with resin between the prism mountains adjacent to each other projected beyond apexes of the prism mountains 120.

The prism mountains 120 are a plurality of triangular patterns formed at regular intervals, and the lenti type block 160 is formed by filling the resin to form an inverted triangle.

Since the prism sheet 100 can separate and scatter the light, the prism mountains 120 and the blocks 160 are formed, for scattering the lamp image widely to attenuate the lamp mura.

Figure 8:
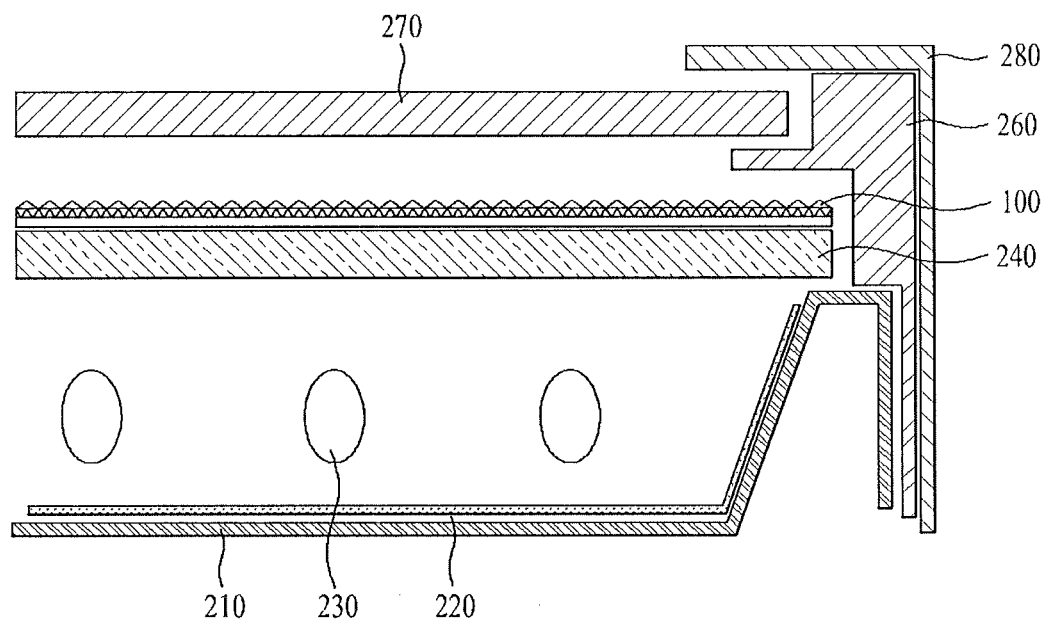
FIG. 8 illustrates a section of a back light unit and a liquid crystal display device having a prism sheet in accordance with one of first to third embodiments of the present invention applied thereto.

FIG. 8 illustrates a section of a back light unit and a liquid crystal display device having a prism sheet in accordance with one of first to third embodiments of the present invention applied thereto.

Referring to FIG. 8, the liquid crystal display device includes a cover bottom 210, a reflective plate 220 formed on an inside surface of the cover bottom 210, a plurality of light sources 230 placed in and supported on the cover bottom 210 and projected over the reflective plate 220 at regular intervals for emission of lights, a diffusion plate 240 over the diffusion plate 240 for diffusing the light, a prism sheet 100 over the diffusion plate 240 having multi-layered prism mountains 120 and 140 for scattering and spreading the light diffused thus uniformly, a mold frame 260 for surrounding and holding the cover bottom 210 and edges of the prism sheet 100, a liquid crystal display panel 270 on the prism sheet 100 seated on edges of the mold frame 260, for displaying an image, and a case top 280 for fastening the mold frame 260 and the liquid crystal display panel 270.

As described before, the prism sheet 100 includes multi-layered prism mountains 120 and 130, and a resin layer or diffusion agent 150 filled in the resin layer formed between adjacent prism mountains at a lowest layer. The prism mountain on an upper side has a pitch greater than the prism mountain at a lower side.

Since the back light unit and the liquid crystal display device of the present invention can spread the light from the diffusion plate 240 uniformly owing to one sheet of prism sheet 100 having multi-layered prism mountains, the back light unit and the liquid crystal display device can prevent the lamp mura from taking place even if a distance between the diffusion plate 240 and the light source is put closer for reducing total thickness of the back light unit.

FIGS. 9A~9B illustrate a section and a graph showing a pitch shift versus a diffusion ratio of a prism sheet in accordance with a first preferred embodiment of the present invention, respectively.

Figure 9:
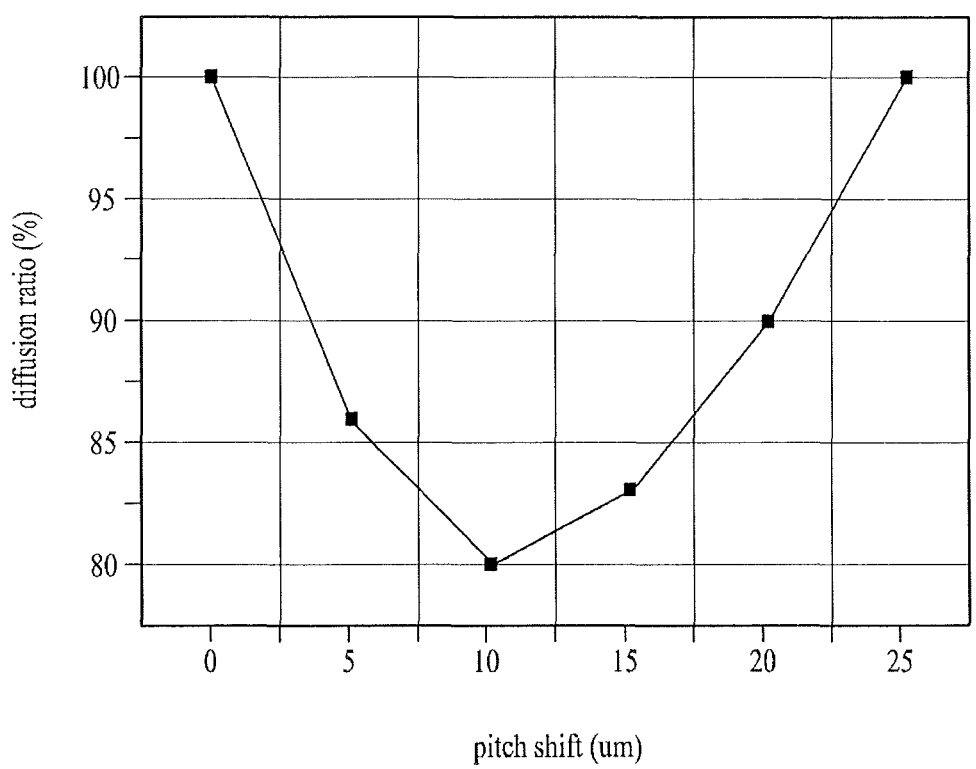
FIGS. 9A~9B illustrate a section and a graph showing a pitch shift versus a diffusion ratio of a prism sheet in accordance with a first preferred embodiment of the present invention, respectively.

Referring to FIG. 9, a shift takes place at the time of formation of the first and second prisms 120 and 140 due to failure of accurate alignment coming form process conditions.

In this instance, pitches of the first prism mountain 120, and the resin layer 130 set to have 25 μm respectively, the pitch of the second prism mountain 140 is set to have 50 μm, the second prism mountain 140 is shifted to a left side by 5 μm inward of 25 μm, and the prism sheet formed thus is subjected to simulation, for comparing diffusion ratios due to the left side 5 μm shift.

As a result of this, in can be known that the left side shift drops the diffusion ratio and attenuates the lamp mura, and a fabricating process for minimizing the shift to 5 μm is required.

As has been described, the prism sheet, and the back light unit and the liquid crystal display device therewith have the following advantages.

The multi-layered prism mountains on one prism sheet, enabling to scatter and spread the light from the diffusion plate uniformly, permits to reduce a total thickness of the back light unit while preventing the lamp mura from taking place, thereby improving a picture quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A prism sheet comprising:
a plurality of prism mountains formed to be aligned with each other on a supporting film; and
lenticular type blocks having resin filled between the prism mountains,
wherein each of the plurality of prism mountains has an isosceles triangular cross section,
wherein one flat side of each of the prism mountains is on the supporting film,
wherein each of the lenticular type blocks has a cross section including two radiuses being in contact with neighboring two prism mountains of the plurality of prism mountains and a convex lens connecting between the two radiuses, and
wherein heights of the lenticular type blocks are greater than heights of the neighboring two prism mountains.

2. A back light unit comprising:
a plurality of light sources arranged at regular intervals for emission of a light;
a cover bottom for supporting and housing the light sources;
a diffusion plate over the light sources having opposite edges supported on the cover bottom for diffusing and forward the light from the light sources; and
a prism sheet on the diffusion plate for scattering and spreading the light from the diffusion plate, uniformly, wherein the prism sheet including;
a plurality of prism mountains formed to be aligned with each other on a supporting film; and
lenticular type blocks having resin filled between the prism mountains,
wherein each of the plurality of prism mountains has an isosceles triangular cross section,
wherein one flat side of each of the prism mountains is on the supporting film
wherein each of the lenticular type blocks has a cross section including two radiuses being in contact with neighboring two prism mountains of the plurality of prism mountains and a convex lens connecting between the two radiuses, and
wherein heights of the lenticular type blocks are greater than heights of the neighboring two prism mountains.

3. A liquid crystal display device comprising:
a liquid crystal display panel; and
a back light unit for directing a light to a back side of the liquid crystal display panel,
wherein the back light unit comprises
a plurality of light sources arranged at regular intervals for emission of a light;
a cover bottom for supporting and housing the light sources;
a diffusion plate over the light sources having opposite edges supported on the cover bottom for diffusing and forward the light from the light sources; and
a prism sheet on the diffusion plate for scattering and spreading the light from the diffusion plate, uniformly, and
wherein the prism sheet comprises
    a plurality of prism mountains formed to be aligned with each other on a supporting film; and
    lenticular type blocks having resin filled between the prism mountains,
wherein each of the plurality of prism mountains has an isosceles triangular cross section,
wherein one flat side of each of the prism mountains is on the supporting film,
wherein each of the lenticular type blocks has a cross section including two radiuses being in contact with neighboring two prism mountains of the plurality of prism mountains and a convex lens connecting between the two radiuses, and
wherein heights of the lenticular type blocks are greater than heights of the neighboring two prism mountains.

4. A prism sheet comprising:
a plurality of prism mountains formed to be aligned with each other on a supporting film; and
lenticular type blocks having resin filled between the prism mountains,
wherein each of the plurality of prism mountains has a triangular cross section,
wherein one flat side of each of the prism mountains is on the supporting film,
wherein each of the lenticular type blocks has a cross section including two radiuses being in contact with neighboring two prism mountains of the plurality of prism mountains and a convex lens connecting between the two radiuses,
wherein the convex lens has two end points which respectively connect to the two radiuses and respectively contact with apexes of the prism mountains, and
wherein heights of the lenticular type blocks are greater than heights of the neighboring two prism mountains.

5. The prism sheet according to claim 4, wherein each of the prism mountains has one flat side that is parallel with and in contact with an upper surface of the supporting film.

6. The prism sheet according to claim 4, wherein the two end points of the convex lens respectively connect to the two radiuses at the respective apexes of the neighboring prism mountains.

7. The prism sheet according to claim 4, wherein the convex lenses of two adjacent lenticular type blocks connect to each other at an apex of a prism mountain between the two adjacent lenticular type blocks.

8. A back light unit comprising:
a plurality of light sources arranged at regular intervals for emission of a light;
a cover bottom for supporting and housing the light sources;
a diffusion plate over the light sources having opposite edges supported on the cover bottom for diffusing and forward the light from the light sources; and
a prism sheet on the diffusion plate for scattering and spreading the light from the diffusion plate, uniformly,
wherein the prism sheet including;
a plurality of prism mountains formed to be aligned with each other on a supporting film; and
lenticular type blocks having resin filled between the prism mountains,
wherein each of the plurality of prism mountains has a triangular cross section,
wherein one flat side of each of the prism mountains is on the supporting film,
wherein each of the lenticular type blocks has a cross section including two radiuses being in contact with neighboring two prism mountains of the plurality of prism mountains and a convex lens connecting between the two radiuses,
wherein the convex lens has two end points which respectively connect to the two radiuses and respectively contact with apexes of the prism mountains, and
wherein heights of the lenticular type blocks are greater than heights of the neighboring two prism mountains.

9. The back light unit according to claim 8, wherein each of the prism mountains has one flat side that is parallel with and in contact with an upper surface of the supporting film.

10. The back light unit according to claim 8, wherein the two end points of the convex lens respectively connect to the two radiuses at the respective apexes of the neighboring prism mountains.

11. The back light unit according to claim 8, wherein the convex lenses of two adjacent lenticular type blocks connect to each other at an apex of a prism mountain between the two adjacent lenticular type blocks.

12. A liquid crystal display device comprising:
a liquid crystal display panel; and
a back light unit for directing a light to a back side of the liquid crystal display panel,
wherein the back light unit comprises
a plurality of light sources arranged at regular intervals for emission of a light;
a cover bottom for supporting and housing the light sources;
a diffusion plate over the light sources having opposite edges supported on the cover bottom for diffusing and forward the light from the light sources; and
a prism sheet on the diffusion plate for scattering and spreading the light from the diffusion plate, uniformly, and wherein the prism sheet comprises
- a plurality of prism mountains formed to be aligned with each other on a supporting film; and lenticular type blocks having resin filled between the prism mountains, wherein each of the plurality of prism mountains has a triangular cross section, wherein one flat side of each of the prism mountains is on the supporting film, wherein each of the lenticular type blocks has a cross section including two radiuses being in contact with neighboring two prism mountains of the plurality of prism mountains and a convex lens connecting between the two radiuses, wherein the convex lens has two end points which respectively connect to the two radiuses and respectively contact with apexes of the prism mountains, and wherein heights of the lenticular type blocks are greater than heights of the neighboring two prism mountains.

13. The liquid crystal display device according to claim 12, wherein each of the prism mountains has one flat side that is parallel with and in contact with an upper surface of the supporting film.

14. The liquid crystal display device according to claim 12, wherein the two end points of the convex lens respectively connect to the two radiuses at the respective apexes of the neighboring prism mountains.

15. The liquid crystal display device according to claim 12, wherein the convex lenses of two adjacent lenticular type blocks connect to each other at an apex of a prism mountain between the two adjacent lenticular type blocks.

\* \* \* \* \*